(12) United States Patent
Reed et al.

(10) Patent No.: US 11,663,441 B2
(45) Date of Patent: May 30, 2023

(54) ACTION SELECTION NEURAL NETWORK TRAINING USING IMITATION LEARNING IN LATENT SPACE

(71) Applicant: DeepMind Technologies Limited, London (GB)

(72) Inventors: Scott Ellison Reed, New York, NY (US); Yusuf Aytar, London (GB); Ziyu Wang, St. Albans (GB); Tom Paine, London (GB); Sergio Gomez Colmenarejo, London (GB); David Budden, London (GB); Tobias Pfaff, London (GB); Aaron Gerard Antonius van den Oord, London (GB); Oriol Vinyals, London (GB); Alexander Novikov, London (GB)

(73) Assignee: DeepMind Technologies Limited, London (GB)

(*) Notice: Subject to any disclaimer, the term of this patent is extended or adjusted under 35 U.S.C. 154(b) by 720 days.

(21) Appl. No.: 16/586,437

(22) Filed: Sep. 27, 2019

(65) Prior Publication Data

US 2020/0104680 A1 Apr. 2, 2020

Related U.S. Application Data

(60) Provisional application No. 62/737,878, filed on Sep. 27, 2018.

(51) Int. Cl.
*G06N 3/006* (2023.01)
*G06F 17/16* (2006.01)
(Continued)

(52) U.S. Cl.
CPC .............. *G06N 3/006* (2013.01); *G06F 17/16* (2013.01); *G06F 18/22* (2023.01); *G06N 3/045* (2023.01);
(Continued)

(58) Field of Classification Search
None
See application file for complete search history.

(56) References Cited

U.S. PATENT DOCUMENTS 10,713,593 B2  7/2020  Chen et al.
11,106,973 B2  8/2021  Shi et al.
(Continued)

OTHER PUBLICATIONS

Abbeel et al., "Apprenticeship learning via inverse reinforcement learning," Proceedings of the twenty-first international conference on Machine learning, Jul. 2044, 8 pages.

(Continued)

*Primary Examiner* — Delomia L Gilliard
(74) *Attorney, Agent, or Firm* — Fish & Richardson P.C.

(57) ABSTRACT

Methods, systems, and apparatus, including computer programs encoded on a computer storage medium, for training an action selection policy neural network, wherein the action selection policy neural network is configured to process an observation characterizing a state of an environment to generate an action selection policy output, wherein the action selection policy output is used to select an action to be performed by an agent interacting with an environment. In one aspect, a method comprises: obtaining an observation characterizing a state of the environment subsequent to the agent performing a selected action; generating a latent representation of the observation; processing the latent representation of the observation using a discriminator neural network to generate an imitation score; determining a reward from the imitation score; and adjusting the current values of the action selection policy neural network parameters based on the reward using a reinforcement learning training technique.

20 Claims, 6 Drawing Sheets

(51) Int. Cl.

| | |
|---|---|
| *G06N 3/08* | (2023.01) |
| *G06F 18/22* | (2023.01) |
| *G06N 3/045* | (2023.01) |
| *G06N 3/048* | (2023.01) |
| *G06V 10/764* | (2022.01) |
| *G06V 10/77* | (2022.01) |
| *G06V 10/82* | (2022.01) |

(52) U.S. Cl.
CPC ............... *G06N 3/048* (2023.01); *G06N 3/08* (2013.01); *G06V 10/764* (2022.01); *G06V 10/7715* (2022.01); *G06V 10/82* (2022.01)

(56) References Cited

U.S. PATENT DOCUMENTS

| | | | | |
|---|---|---|---|---|
| 2005/0114278 | A1* | 5/2005 | Saptharishi | G06N 3/082 706/46 |
| 2008/0240616 | A1 | 10/2008 | Haering et al. | |
| 2012/0150531 | A1 | 6/2012 | Bangalore et al. | |
| 2014/0025613 | A1* | 1/2014 | Ponulak | G06N 3/049 706/25 |
| 2015/0019214 | A1 | 1/2015 | Wang et al. | |
| 2015/0276238 | A1 | 10/2015 | Matsuoka et al. | |
| 2017/0132512 | A1 | 5/2017 | Ioffe | |
| 2017/0185872 | A1 | 6/2017 | Chakraborty | |
| 2017/0372202 | A1 | 12/2017 | Ginsburg et al. | |
| 2018/0101766 | A1 | 4/2018 | He et al. | |
| 2018/0157661 | A1 | 6/2018 | Zoldi et al. | |
| 2018/0211152 | A1 | 7/2018 | Migacz et al. | |
| 2018/0336472 | A1 | 11/2018 | Ravi | |
| 2019/0122106 | A1 | 4/2019 | Lee et al. | |
| 2019/0156196 | A1 | 5/2019 | Zoldi et al. | |
| 2019/0171929 | A1 | 6/2019 | Abadi et al. | |
| 2019/0228310 | A1 | 7/2019 | Inagaki | |
| 2019/0251445 | A1 | 8/2019 | Movshovitz-Attias et al. | |
| 2019/0258918 | A1* | 8/2019 | Wang | G06N 3/0472 |
| 2019/0258938 | A1 | 8/2019 | Mnih et al. | |
| 2019/0303703 | A1 | 10/2019 | Kumar et al. | |
| 2019/0311257 | A1 | 10/2019 | Chang et al. | |
| 2019/0332922 | A1* | 10/2019 | Nachum | G06N 3/0454 |
| 2019/0354689 | A1 | 11/2019 | Li et al. | |
| 2019/0370638 | A1 | 12/2019 | Green et al. | |
| 2020/0065560 | A1* | 2/2020 | Kaneko | G06N 3/0472 |
| 2020/0074305 | A1 | 3/2020 | Cao et al. | |
| 2020/0089246 | A1* | 3/2020 | McGill, Jr. | G05D 1/0088 |
| 2020/0089772 | A1 | 3/2020 | Gomez et al. | |
| 2020/0090043 | A1 | 3/2020 | Mnih et al. | |
| 2020/0104679 | A1 | 4/2020 | van den Oord et al. | |
| 2020/0174490 | A1* | 6/2020 | Ogale | G05D 1/0221 |
| 2020/0183047 | A1* | 6/2020 | Denli | G06F 17/18 |
| 2020/0234468 | A1 | 7/2020 | Lerchner et al. | |
| 2021/0004677 | A1 | 1/2021 | Menick et al. | |
| 2021/0097401 | A1 | 4/2021 | Rannalho et al. | |
| 2021/0150357 | A1* | 5/2021 | Karras | G06N 3/088 |
| 2021/0158162 | A1* | 5/2021 | Hafner | G06F 30/27 |
| 2021/0287297 | A1 | 9/2021 | Hayward et al. | |
| 2022/0076099 | A1* | 3/2022 | Sermanet | G06N 3/0454 |

OTHER PUBLICATIONS

Arjovsky et al., "Towards principled methods for training generative adversarial network," arXiv, Jan. 2017, 17 pages.
Arjovsky et al., "Wasserstein generative adversarial networks," International conference on machine learning, Jul. 2017, 10 pages.
Atal et al., "Adaptive predictive coding of speech signals," Bell System Technical Journal, Oct. 1970, 14 pages.
Aytar et al., "Playing hard exploration games by watching youtube," Advances in Neural Information Processing Systems, Dec. 2018, 12 pages.
Ba et al., "Layer normalization," arXiv, Jul. 2016, 14 pages.
Bakker et al.,"Robot see, robot do: An overview of robot imitation," AISB96 Workshop on Learning in Robots and Animals, Apr. 1996.
Baram et al., "End-to-end differentiable adversarial imitation learning," Proceedings of the 34th International Conference on Machine Learning—vol. 70, Aug. 2017, 10 pages.
Barth-Maron et al., "Distributed distributional deterministic policy gradients," arXiv, Apr. 2018, 16 pages.
Beattie et al., "Deepmindlab," arXiv, Dec. 2016, 11 pages.
Belghazi et al., "Mine: Mutual information neural estimation," arXiv, Jun. 2018, 18 pages.
Bellemare et al., "A distributional perspective on reinforcement learning," arXiv, Jul. 2017, 19 pages.
Bengio et al., "Adaptive importance sampling to accelerate training of a neural probabilistic language model," IEEE Transactions on Neural Networks, Feb. 2008, 31 pages.
Cho et al., "Learning phrase representations using rnn encoderdecoder for statistical machine translation," arXiv, Sep. 2014, 15 pages.
Chopra et al., "Learning a similarity metric discriminatively, with application to face verification," CVPR, Jun. 2005, 8 pages.
Clevert et al., "Fast and accurate deep network learning by exponential linear units (elus)," arXiv, Feb. 2016, 14 pages.
Doersch et al., "Multi-task Self-Supervised Visual Learning," Proceedings of the IEEE International Conference on Computer Vision, Aug. 2017,13 pages.
Doersch et al., "Unsupervised visual representation learning by context prediction," Proceedings of the IEEE International Conference on Computer Vision, Dec. 2015, 9 pages.
Donahue et al., "Adversarial feature learning," arXiv, Apr. 2017, 18 pages.
Duan et al., "One-shot imitation learning," Advances in neural information processing systems, Dec. 2017, 12 pages.
Elias, "Predictive coding—I," IRE Transactions on Information Theory, Mar. 1955, 9 pages.
Espeholt et al., "IMPALA: Scalable Distributed Deep-RL with Importance Weighted Actor-Learner Architectures," arXiv, Jun. 2018, 22 pages.
Finn et al., "A connection between generative adversarial networks, inverse reinforcement learning, and energy-based models," arXiv, Nov. 2016, 10 pages.
Finn et al., "One-shot visual imitation learning via meta-learning," arXiv, Sep. 2017, 12 pages.
Friston, "A theory of cortical responses," Philosophical transactions of the Royal Society B: Biological sciences, Apr. 2005, 22 pages.
Fu et al., "Learning robust rewards with adversarial inverse reinforcement learning," arXiv, Oct. 2017, 15 pages.
Goodfellow et al., "Generative adversarial nets," Advances in neural information processing systems, Dec. 2014, 9 pages.
Gutmann et al., "Noise-contrastive estimation: A new estimation principle for unnormalized statistical models," Proceedings of the Thirteenth International Conference on Artificial Intelligence and Statistics, Mar. 2010, 8 pages.
He et al., "Identity mappings in deep residual networks," arXiv, Jul. 2016, 15 pages.
Hester et al., "Deep q-learning from demonstrations," Thirty-Second AAAI Conference on Artificial Intelligence, Apr. 2018, 8 pages.
Hinton et al., "Deep neural networks for acoustic modeling in speech recognition," IEEE Signal processing magazine 29, Nov. 2012, 16 pages.
Hinton et al., "Neural Networks for Machine Learning Lecture 6a Overview of mini—batch gradient descent," UT Lectures from the course Neural Networks for Machine Learning, 2012, 31 pages.
Ho et al., "Generative adversarial imitation learning," Advances in neural information processing systems, Dec. 2016.
Horgan et al., "Distributed prioritized experience replay," arXiv, Mar. 2018, 19 pages.
Hosu et al., "Playing atari games with deep reinforcement learning and human checkpoint replay," arXiv, Jul. 2016, 6 pages.
Hu et al., "Mining and summarizing customer reviews," Proceedings of the tenth ACM SIGKDD international conference on Knowledge discovery and data mining, Apr. 2004, 10 pages.
Hyvarinen et al., "Unsupervised feature extraction by time-contrastive learning and nonlinear ICA," Advances in Neural Information Processing Systems, Dec. 2016, 9 pages.

(56) References Cited

OTHER PUBLICATIONS

Ioffe et al., "Batch normalization: Accelerating deep network training by reducing internal covariate shift," arXiv.
Jozefowicz et al., "Exploring the Limits of Language Modeling," arXiv, Feb. 2016, 11 pages.
Kingma et al., "Adam: A method for stochastic optimization," arXiv, Jan. 2017, 15 pages.
Kiros et al., "Skip-thought vectors," Advances in neural information processing systems, Dec. 2015, 9 pages.
Kostrikov et al., "Discriminator-Actor-Critic: Addressing sample inefficiency and reward bias in inverse reinforcement learning," arXiv, Oct. 2018, 14 pages.
Krizhevsky et al., "Imagenet classification with deep convolutional neural network," Advances in neural information processing systems, Dec. 2012, 9 pages.
Le et al., "Distributed representations of sentences and document," International conference on machine learning, Jan. 2014, 9 pages.
Li et al., "Infogail: Interpretable imitation learning from visual demonstrations," Advances in Neural Information Processing Systems, Dec. 2017, 11 pages.
Li et al., "Learning question classifiers," Proceedings of the 19th international conference on Computational linguistics—vol. 1, Aug. 24-Sep. 1, 2002, 7 pages.
Lillicrap et al., "Continuous control with deep reinforcement learning," arXiv, Sep. 2015, 14 pages.
Maaten et al., "Visualizing data using t-SNE," Journal of machine learning research, Nov. 2008, 27 pages.
Mikolov et al., "Efficient estimation of word representations in vector space," arXiv, Sep. 2013, 12 pages.
Miyamoto et al., "A kendama learning robot based on bi-directional theory," Neural Networks 9, Nov. 1996, 22 pages.
Mnih et al., "A fast and simple algorithm for training neural probabilistic language models," arXiv, Jun. 2012, 8 pages.
Mnih et al., "Asynchronous methods for deep reinforcement learning," International conference on machine learning, Jun. 2016, 10 pages.
Ng et al., "Algorithms for inverse reinforcement learning," Icml, Jun. 2000, 8 pages.
Noroozi et al., "Unsupervised learning of visual representations by solving jigsaw puzzles," arXiv, Aug. 2017, 19 pages.
Oord et al., "Conditional image generation with pixelcnn decoders," Advances in neural information processing systems, Dec. 2016, 9 pages.
Oord et al., "Pixel recurrent neural networks," arXiv, Aug. 2016, 11 pages.
Oord et al., "Representation learning with contrastive predictive coding," arXiv, Jan. 2019, 13 pages.
Oord et al., "Wavenet: A generative model for raw audio," arXiv, Sep. 2016, 15 pages.
Panayotov et al., "Librispeech: an asr corpus based on public domain audio books," 2015 IEEE International Conference on Acoustics, Speech and Signal Processing (ICASSP), Apr. 2015, 5 pages.
Pang et al., "A sentimental education: Sentiment analysis using subjectivity summarization based on minimum cuts," arXiv, 8 pages.
Pang et al., "Seeing stars: Exploiting class relationships for sentiment categorization with respect to rating scales," arXiv, Jun. 2005, 11 pages.
Pohlen et al., "Observe and look further: Achieving consistent performance on atari," arXiv, May 2018, 19 pages.
Pomerleau et al., "Alvinn: An autonomous land vehicle in a neural network," Advances in neural information processing systems, Jan. 1989, 9 pages.
Povey et al., "The kaldi speech recognition toolkit," IEEE 2011 workshop on automatic speech recognition and understanding, Dec. 2011, 4 pages.
Radford et al., "Learning to Generate Reviews and Discovering Sentiment," arXiv, Apr. 2017, 9 pages.
Rao et al., "Predictive coding in the visual cortex: a functional interpretation of some extra-classical receptive-field effects," Nature neuroscience, Jan. 1999, 9 pages.
Russakovsky et al., "ImageNet Large Scale Visual Recognition Challenge," arXiv, Jan. 2015, 43 pages.
Schaal et al., "Learning from demonstration," Advances in neural information processing systems, 1997, 7 pages.
Schaul et al., "Prioritized experience replay," arXiv, Feb. 2016, 21 pages.
Schroff et al., "FaceNet: A unified embedding for face recognition and clustering," Proceedings of the IEEE conference on computer vision and pattern recognition, Jun. 2015, 9 pages.
Sermanet et al., "Time-contrastive networks: Self-supervised learning from video," arXiv, Mar. 2018, 15 pages.
Silver et al., "Deterministic policy gradient algorithms," Proceedings of Machine Learning Research, Jun. 2014, 9 pages.
Sutskever et al., "Sequence to sequence learning with neural networks," Advances in neural information processing systems, Dec. 2014, 9 pages.
Sutton et al., "Reinforcement learning: An introduction," MIT press, Oct. 2018, 10 pages.
Tassa et al., "Deepmind control suite," arXiv, Jan. 2018, 24 pages.
Ulyanov et al., "Instance normalization: the missing ingredient for fast stylization," arXiv, Nov. 2017, 6 pages.
Vaswani et al., "Attention is all you need," Advances in neural information processing system, Dec. 2017, 11 pages.
Vecerik et al., "Leveraging demonstrations for deep reinforcement learning on robotics problems with sparse rewards," arXiv, 10 pages.
Vinyals et al., "Show and tell: A neural image caption generator," Proceedings of the IEEE conference on computer vision and pattern recognition, Dec. 2015, 9 pages.
Wang et al., "Baselines and bigrams: Simple, good sentiment and topic classification," Proceedings of the 50th annual meeting of the association for computational linguistics: Short papers—vol. 2, Jul. 2012, 5 pages.
Wang et al., "Unsupervised Learning of Visual Representations using Videos," arXiv, Oct. 2015, 9 pages.
Weinberger et al., "Distance metric learning for large margin nearest neighbor classification," Journal of Machine Learning Research 10, 38 pages.
Wiebe et al., "Annotating expressions of opinions and emotions in language," arXiv, May 2005, 54 pages.
Wiskott et al., "Slow feature analysis: Unsupervised learning of invariances," Neural computation, Apr. 2002, 56 pages.
Zhang et al., "Colorful image colorization," arXiv, Oct. 2016, 29 pages.
Zhao et al., "Self-adaptive hierarchical sentence model," Twenty-Fourth International Joint Conference on Artificial Intelligence, Jun. 2015, 8 pages.
Zhu et al., "Aligning books and movies: Towards story-like visual explanations by watching movies and reading books," Proceedings of the IEEE international conference on computer vision, Dec. 2015, 9 pages.
Zhu et al., "Reinforcement and imitation learning for diverse visuomotor skills," arXiv, May 2018, 12 pages.
Ziebart et al., "Maximum entropy inverse reinforcement learning," AAAI, Jul. 2008, 6 pages.

* cited by examiner

ACTION SELECTION NEURAL NETWORK TRAINING USING IMITATION LEARNING IN LATENT SPACE

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that can train an encoder neural network to generate latent representations of observations that robustly represent generic features in the observations without being specialized towards solving a single task. This specification further describes a system implemented as computer programs on one or more computers in one or more locations for training an action selection network that controls an agent interacting with an environment by selecting actions to be performed by the agent that enable the agent to accomplish a task.

According to a first aspect there is provided a method performed by one or more data processing apparatus for training an encoder neural network having a set of encoder neural network parameters and that is configured to receive an input observation and to process the input observation in accordance with the encoder neural network parameters to generate a latent representation of the input observation. The method includes obtaining a sequence of observations. For each observation in the sequence of observations, the method includes processing the observation using the encoder neural network in accordance with current values of the encoder neural network parameters to generate a latent representation of the observation.

For each of one or more given observations in the sequence of observations, the method includes generating, from the latent representation of the given observation and the latent representations of one or more observations that precede the given observation in the sequence of observations, a context latent representation of the given observation which jointly summarizes the latent representation of the given observation and the latent representations of the one or more observations that precede the given observation in the sequence of observations. The method includes generating, from the context latent representation of the given observation, a respective estimate of the latent representations of one or more particular observations that are after the given observation in the sequence of observations. A gradient of a loss function is determined with respect to the current values of the encoder neural network parameters, where for each of the one or more given observations, the loss function characterizes an accuracy of the respective estimates of the latent representations of the one or more particular observations that are after the given observation in the sequence of observations. The current values of the encoder neural network parameters are updated using the gradient.

In some implementations, the sequence of observations includes a sequence of segments of an audio waveform.

In some implementations, the sequence of observations includes a sequence of regions of a given image or a sequence of respective images.

In some implementations, the sequence of observations includes a sequence of sentences in a natural language.

In some implementations, the encoder neural network is configured for use by a reinforcement learning system to generate latent representations of input observations of an environment which are used to select actions to be performed by the reinforcement learning agent to interact with the environment.

In some implementations, the encoder neural network includes one or more convolutional neural network layers, and the latent representation of an observation is a compressed representation of the observation.

In some implementations, generating, from the context latent representation of the given observation, a respective estimate of the latent representations of one or more particular observations that are after the given observation in the sequence of observations includes, for each particular observation, identifying a respective prediction parameter matrix based on a number of observations separating the given observation and the particular observation in the sequence of observations. A product is determined between the context latent representation of the given observation and the prediction parameter matrix.

In some implementations, the loss function is a noise contrastive estimation loss function.

In some implementations, determining a gradient of the loss function with respect to the current values of the encoder neural network parameters includes, for each of the one or more given observations, for each of the one or more particular observations that are after the given observation in the sequence of observations, obtaining a positive example observation that is representative of the particular observation. The positive example observation is processed using the encoder neural network to generate a positive example latent representation. One or more negative example observations are obtained that are not representative of the particular observation. For each of the one or more negative example observations, the negative example observation is processed using the encoder neural network to generate a respective negative example latent representation. A value of the loss function is determined based on a similarity between the estimate of the latent representation of the particular observation and each of: (i) the positive example latent representation, and (ii) the one or more negative example latent representations.

In some implementations, determining a value of the loss function based on a similarity between the estimate of the latent representation of the particular observation and each of: (i) the positive example latent representation, and (ii) the one or more negative example latent representations, includes determining the value of the loss function based on a ratio of: the similarity between the estimate of the latent representation of the particular observation and the positive example latent representation, and a sum of the respective similarities between the estimate of the latent representation of the particular observation and: (i) the positive example latent representation, and (ii) each of the one or more negative example latent representations.

In some implementations, the similarity between the estimate of the latent representation of the particular observation and the positive example latent representation includes an exponential of a dot product between the estimate of the latent representation of the particular observation and the positive example latent representation.

In some implementations, the similarity between the estimate of the latent representation of the particular observation and a negative example latent representation includes an exponential of a dot product between the estimate of the latent representation of the particular observation and the negative example latent representation.

In some implementations, generating, from the latent representation of the given observation and the latent representations of one or more observations that precede the given observation in the sequence of observations, a context latent representation of the given observation includes processing the latent representation of the given observation and the latent representations of one or more observations that precede the given observation in the sequence of observations using a context neural network in accordance with current values of context neural network parameters to generate the context latent representation of the given observation.

In some implementations, the method further includes determining a gradient of the loss function with respect to the current values of the context neural network parameters, and updating the current values of the context neural network parameters using the gradient.

In some implementations, the context neural network is a recurrent neural network.

According to another aspect there is provided a method including: obtaining a sequence of observations; for each observation in the sequence of observations, processing the observation using an encoder neural network which has been trained using the method of the first aspect to generate a latent representation of the observation; and providing the latent representations of the observations for use in characterizing the sequence of observations.

According to another aspect there is provided a method including obtaining a sequence of observations. For each observation in the sequence of observations, the method includes processing the observation using an encoder neural network which has been trained using the method of the first aspect to generate a latent representation of the observation. The method includes generating, from the latent representation of the observation and latent representations generated for one or more observations that precede the observation in the sequence of observations, a context latent representation of the observation which jointly summarizes the latent representation of the observation and the latent representations generated for one or more observations that precede the observation in the sequence of observations. The context latent representations of the observations are provided for use in characterizing the sequence of observations.

According to another aspect, there is provided a method for training an action selection policy neural network, where the action selection policy neural network has a set of action selection policy neural network parameters, where the action selection policy neural network is configured to process an observation characterizing a state of an environment in accordance with values of the action selection policy neural network parameters to generate an action selection policy output, where the action selection policy output is used to select an action to be performed by an agent interacting with an environment. The method includes obtaining an observation characterizing a state of the environment subsequent to the agent performing a selected action. A latent representation of the observation is generated, including: (i) processing the observation using an encoder neural network to generate the latent representation of the observation, where the encoder neural network has been trained to process a given observation to generate a latent representation of the given observation that is predictive of latent representations generated by the encoder neural network of one or more other observations that are after the given observation in a sequence of observations; or (ii) processing the observation using the action selection policy neural network to generate the latent representation of the observation as an intermediate output of the action selection policy neural network.

The latent representation of the observation is processed using a discriminator neural network to generate an imitation score, where the imitation score characterizes a likelihood that the observation is included in an expert trajectory. An expert trajectory is a sequence of observations characterizing respective states of the environment while a given agent interacts with the environment by performing a sequence of actions that accomplish a particular task. A reward is determined from the imitation score. The current values of the action selection policy neural network parameters are adjusted based on the reward using a reinforcement learning training technique.

In some implementations, the method further includes obtaining a task reward characterizing a progress of the agent towards accomplishing the particular task, and determining the reward from the task reward in addition to the imitation score.

In some implementations, determining the reward from the task reward in addition to the imitation score includes determining the reward as a weighted linear combination of the task reward and the imitation score.

In some implementations, the method further includes obtaining an expert observation from an expert trajectory in a set of multiple expert trajectories. The expert observation is processed using the encoder neural network to generate a latent representation of the expert observation. The latent representation of the expert observation is processed using the discriminator neural network to generate a given imitation score. A loss is determined based on a difference between the given imitation score and a target imitation score which indicates that the expert observation is from an expert trajectory. The current values of the discriminator neural network parameters are adjusted based on the loss.

In some implementations, the method further includes determining a loss based on a difference between the imitation score and a target imitation score which indicates that the observation is not from an expert trajectory. The current values of the discriminator neural network parameters are adjusted based on the loss.

In some implementations, the observation includes an image.

In some implementations, the encoder neural network is trained, using the method of the first aspect, on training data including a set of expert trajectories.

In some implementations, the method further includes processing the latent representation of the observation using a second discriminator neural network to generate a second imitation score, where the second imitation score characterizes a likelihood that the observation is: (i) included in an expert trajectory, and (ii) within a threshold number of observations of a last observation of the expert trajectory. The reward is determined from the second imitation score in addition to the imitation score.

In some implementations, the method further includes obtaining an expert observation from an expert trajectory, where the expert observation is within the threshold number of observations of the last observation of the expert trajectory. The expert observation is processed using the encoder neural network to generate a latent representation of the expert observation. The latent representation of the expert observation is processed using the second discriminator neural network to generate a given second imitation score. A loss is determined based on a difference between the given second imitation score and a target imitation score which indicates that the expert observation is from an expert trajectory and is within the threshold number of observations of the last observation in the expert trajectory. The current values of the second discriminator neural network parameters are adjusted based on the loss.

In some implementations, the method further includes processing the latent representation of the observation using the second discriminator neural network to generate a particular second imitation score. A loss is determined based on a difference between the particular second imitation score and a target imitation score which indicates that the observation is not from within the threshold number of observations of the last observation in an expert trajectory. The current values of the second discriminator neural network parameters are adjusted based on the loss.

In some implementations, the discriminator neural network has a single neural network layer.

In some implementations, obtaining an observation characterizing a state of the environment subsequent to the agent performing a selected action includes sampling the observation from a replay buffer.

In some implementations, the reinforcement learning training technique is a deep deterministic policy gradient training technique.

In some implementations, the action selection policy neural network includes a Q network and a policy network.

According to another aspect there is provided a system including one or more computers and one or more storage devices storing instructions that when executed by the one or more computers cause the one or more computers to perform the operations of any of the preceding methods.

According to another aspect there are provided one or more computer storage media storing instructions that when executed by one or more computers cause the one or more computers to perform the operations of any of the preceding methods.

Particular embodiments of the subject matter described in this specification can be implemented so as to realize one or more of the following advantages.

This specification describes a training system that trains an encoder neural network on sequences of observations. In particular, for each observation in a sequence, the training system trains the encoder neural network to generate a latent representation of the observation that is predictive of latent representations of subsequent observations in the sequence. In this manner, the training system trains the encoder neural network to generate latent representations which robustly represent generic features in observations without being specialized towards solving a single task (e.g., unlike systems that generate representations that are specialized for being used in object classification for images). At the same time, the latent representations are less likely to characterize low-level information and noise that is more local. Features or information characterizing an observation may be referred to as being "global" if they summarize aspects of the entire observation, and "local" otherwise. For example, in an image, global features or information may characterize the type of an object depicted in the image, while local features and information may characterize the respective colors of a collection of pixels in a region of the image.

Generally, the latent representation of an observation is a compact representation of the observation, i.e., that has a lower dimensionality than the observation. By requiring that the latent representations be predictive in latent space (i.e., the space of latent representations) rather than in observation space (i.e., the space of observations), the training system enables the latent representations to focus on representing global structure in observations rather than noisy local information. Moreover, the training system may consume fewer computational resources (e.g., memory and computing power) than if it trained the encoder neural network to generate latent representations that are predictive in observation space.

The training system can train the encoder neural network using unsupervised learning techniques, that is, on sequences of observations that are not explicitly associated with corresponding labels (e.g., labels that specify phonemes corresponding to a sequence of audio data segments). This makes the training system more broadly applicable because it can train the encoder neural network on large amounts of unlabeled sequence data (i.e., that is far more plentiful than the potentially limited amounts of labeled sequence data).

This specification further describes a training system for training an action selection network that controls an agent interacting with an environment by selecting actions to be performed by the agent that enable the agent to accomplish a task. The training system trains the action selection network to imitate expert demonstrations of the task that are specified by expert trajectories, i.e., sequences of expert observations characterizing respective states of the environment while a sequence of expert actions are performed that accomplish the task. In particular, the training system trains a discriminator neural network to generate imitation scores that discriminate between "agent" observations (i.e., that result from actions selected using the action selection network) and expert observations. In parallel, the training system trains the action selection network to select actions that result in agent observations which the discriminator network misclassifies as being expert observations.

The discriminator neural network generates an imitation score characterizing the likelihood that an observation is an expert observation by processing a latent representation of the observation. Generating the imitation scores based on the latent representations of observations results in the action selection network being trained to imitate the expert demonstrations in "latent space" (i.e., the space of possible latent representations) rather than in "observation space" (i.e., the space of possible observations). Latent representations of observations may be compact representations of high-level features of the environment that are relevant to performing the task, while the observations themselves may encode substantial amounts of noisy and superfluous information that is irrelevant to performing the task. Therefore, training the action selection network to imitate the expert demonstrations in latent space may enable the action selection network to be trained more effectively, e.g., over fewer training iterations and using fewer computational resources (e.g., memory and computing power). Moreover, training the action selection network to imitate expert observations in latent space may enable the action selection network to select actions that enable an agent to perform tasks more effectively, e.g., more quickly.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system for training an encoder neural network that is configured to process input data to generate a compact (i.e., lower-dimensional) representation of the input data. The input data may be referred to as an "observation", and the compact representation of the observation may be referred to as a "latent" representation. The system trains the encoder network on sequences of observations, e.g., sequences of images from a video, or sequences of audio segments from audio data. In particular, for each observation in a sequence, the system trains the encoder network to generate a latent representation for the observation that is predictive of the latent representations of subsequent observations in the sequence. In this manner, the encoder network learns to generate latent representations that robustly represent generic features in observations, without being specialized towards solving a single supervised task, e.g., unlike systems that generate representations that are specialized for being used in object classification for images.

This specification further describes a system for training an action selection neural network that is used to control an agent interacting with an environment to accomplish a task by selecting actions to be performed by the agent. The training system trains the action selection network to imitate expert demonstrations of the task that are specified by expert trajectories. In particular, the training system trains a discriminator neural network to process latent representations of observations to generate imitation scores that discriminate between agent observations and expert observations. In parallel, the training system trains the action selection network to select actions that result in agent observations which the discriminator network misclassifies as being expert observations.

These features and other features are described in more detail below.

Figure 1:
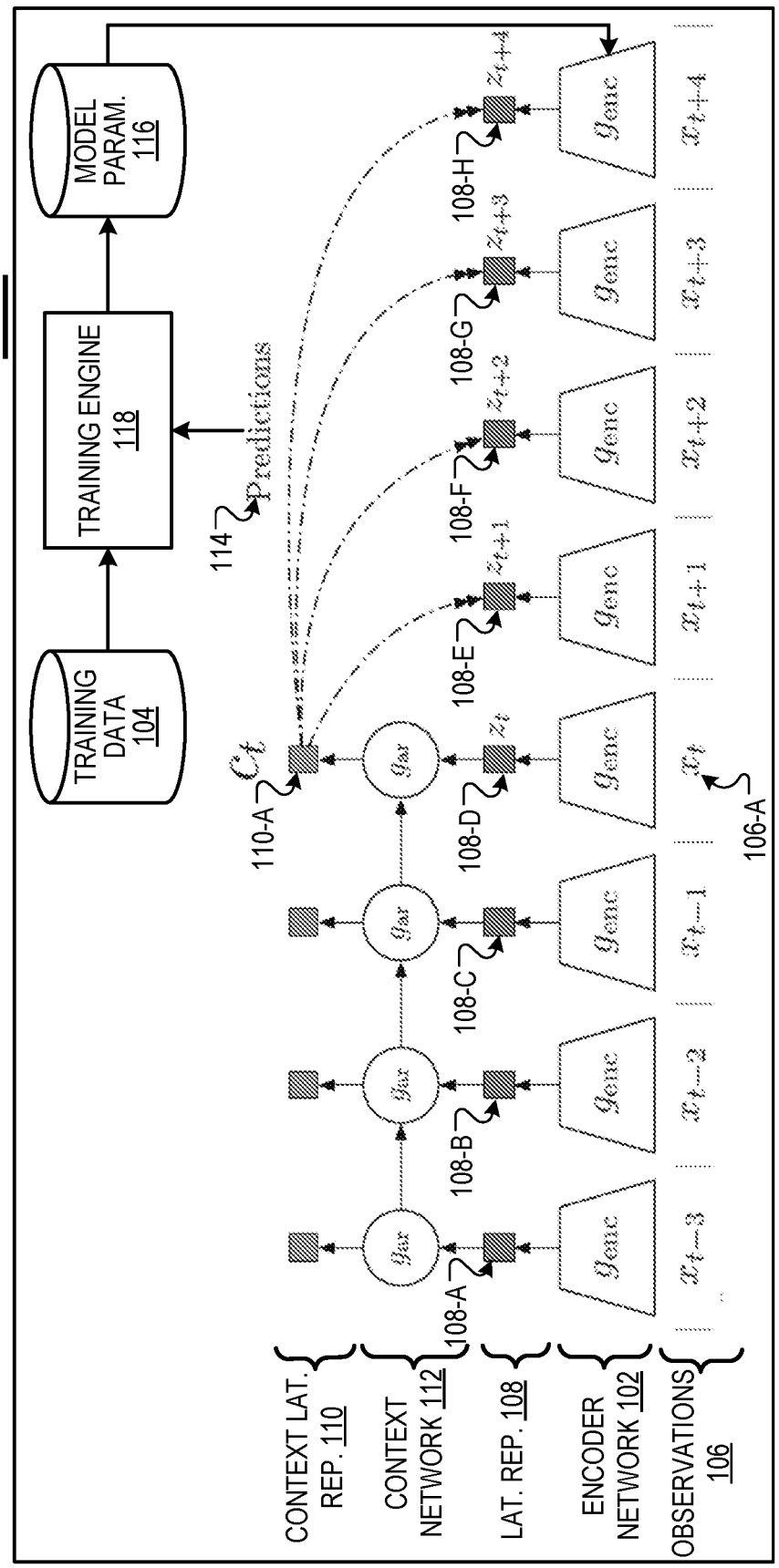
FIG. 1 shows an example encoder network training system.

FIG. 1 shows an example encoder network training system 100. The encoder network training system 100 is an example of a system implemented as computer programs on one or more computers in one or more locations in which the systems, components, and techniques described below are implemented.

The training system 100 trains an encoder neural network 102 that is configured to process an observation (e.g., an audio data segment, an image, or a sentence in a natural language) to generate a latent representation of the observation. The latent representation of an observation can be represented as an ordered collection of numerical values, e.g., a vector or matrix of numerical values, and generally has a lower dimensionality than the observation itself. The encoder neural network can have any neural network architecture that enables it to perform its described function, e.g., a convolutional architecture with residual blocks.

The training system 100 trains the encoder neural network 102 on a set of training data 104 that consists of sequences of observations. Each sequence of observations may be, e.g., a sequence of audio data segments from an audio waveform, a sequence of images of an environment that are captured at respective time points, a sequence of regions from a single image, or a sequence of sentences in a natural language.

To train the encoder neural network 102 on a particular sequence of observations 106 $\{\ldots, x_{t-2}, x_{t-1}, x_t, x_{t+1}, x_{t+2}, \ldots\}$, the training system 100 processes each observation in the sequence (e.g., the observation 106-A) using the encoder neural network 102 to generate corresponding latent representations 108 of the observations (e.g., the latent representation 108-D).

The training system 100 processes the latent representations 108 to generate a respective "context" latent representation 110 for each of one or more of the observations (e.g., the training system generates the context latent representation 110-A for the observation 106-A). The context latent representation for an observation jointly summarizes: (i) the latent representation for the observation, and (ii) the latent representations for one or more preceding observations (and, as with the latent representations, can be represented as an ordered collection of numerical values). The training system 100 may refrain from generating context latent representations 110 for one or more initial observations in the sequence, e.g., the first observation (which is not preceded by any other observations).

The training system 100 can generate the context latent representation for an observation in any of a variety of ways. For example, the training system 100 can generate the context representation for an observation by processing the latent representation for the observation and the latent representations for one or more preceding observations using a context neural network 112. The context neural network 112 can have any appropriate neural network architecture that enables it to perform its described function, e.g., a recurrent neural network architecture (e.g., with gated recurrent units (GRUs)). In one example, the context neural network 112 may be a recurrent neural network that sequentially processes the latent representations of the observations, and the context latent representation of an observation may be identified as the output generated by the context neural network 112 in response to processing the observation. In the example illustrated in FIG. 1, the training system 100 may generate the context latent representation 110-A for the observation 106-A by sequentially processing the latent representations 108-A-108-D using a recurrent context neural network 112.

The training system 100 processes the context latent representation corresponding to an observation to generate predictions 114 for the latent representations of subsequent observations. For example, the training system 100 may process the context latent representation 110-A corresponding to the observation 106-A to generate a respective prediction 114 for each of the latent representations 108-E-108-

H. In one example, the training system 100 may process a context latent representation to predict the latent representation of a subsequent observation by applying a linear transformation (e.g., defined by a parameter matrix and a bias vector) to the context latent representation. In a particular example, the training system 100 may process a context latent representation $c_t$ for the observation at position t to generate a prediction $p_{t+k}$ for the latent representation of the observation at position t+k as:

$$p_{t+k} = W_k \cdot c_t \quad (1)$$

where $W_k$ is a parameter matrix specifying a linear transformation. The training system 100 may apply different linear transformations to the context latent representation to generate predictions for the latent representations of different subsequent observations.

In generating predictions 114 for the latent representations of observations subsequent to a given observation, the training system 100 uses only information from the latent representations of the given observation and observations preceding the given observation. That is, the training system 100 tries to predict what happens next in the sequence after the given observation given only information available as of the given observation. In doing so, the training system requires the latent representations representing the information available as of the given observation to be sufficiently predictive of what happens next in the sequence after the given observation.

The training system 100 trains the encoder neural network 102 by updating the current values of its model parameters 116 to encourage the generation of latent representations that are more predictive of subsequent latent representations, i.e., that enable subsequent latent representations to be predicted more accurately. More specifically, the training system 100 uses a training engine 118 to determine gradients of an objective (loss) function that characterizes the accuracy of the predictions 114, and then uses the gradients to adjust the current values of the model parameters 116 of the encoder neural network 102. The training engine 118 may determine the gradients, e.g., using backpropagation techniques, and the training engine 118 may use the gradients to adjust the current values of the model parameters in accordance with any appropriate gradient descent optimization procedure, e.g., RMSprop or Adam. In addition to training the encoder neural network 102, the training system 100 may jointly train: (i) the context neural network 112, and (ii) the parameter values of the transformations applied to the context latent representations to predict the latent representations of subsequent observations.

Generally, the training engine 118 trains the encoder neural network 102 over multiple training iterations. At each training iteration, the training engine 118 may train the encoder neural network 102 on a respective "batch" (set) of sequences of observations sampled from the training data 104.

In some implementations, the training system 100 may train the encoder neural network 102 using a "noise contrastive estimation" (NCE) objective function. To evaluate the NCE objective function $\mathcal{L}$ for a prediction p of a latent representation z, the training system 100 obtains a set $Z^-$ of "negative" latent representations $z^-$ that differ from z, and evaluates the objective function $\mathcal{L}(p)$ as:

$$\mathcal{L}(p) = -\log \frac{S(p, z)}{S(p, z) + \sum_{z^- \in Z^-} S(p, z^-)} \quad (2)$$

where $S(p, z)$ refers a similarity measure between the prediction p and the latent representation z, and each $S(p, z^-)$ refers to a similarity measure between the prediction p and the latent representation $z^-$. The training system 100 may obtain the set $Z^-$ of negative latent representations by randomly sampling "negative" observations from the training data 104 (i.e., that differ from the observation corresponding to the latent representation z being predicted), and processing the negative observations using the encoder neural network 102. The similarity measure $S(p, z)$ may be evaluated as, e.g.:

$$S(p,z) = \exp(p^T z) \quad (3)$$

where $p^T$ refers to the transpose of p. The training system 100 may determine the overall value of the objective function as:

$$\mathcal{L} = \sum_p \mathcal{L}(p) \quad (4)$$

where the sum is over each prediction p of a corresponding latent representation.

Training the encoder neural network in this manner (e.g., as described above) enables it to generate latent representations that encode the underlying shared information between different parts of sequences of observations, while discarding low-level information and noise that is more local. In particular, the encoder neural network may learn to generate latent representations characterizing global features that manifest over multiple observations, e.g., phonemes and intonation in speech (if the observations are audio data segments), objects in an image (if the observations are portions of the image), the story line in a portion of text (if the observations are sentences in the text), or actions being performed over multiple video frames (if the observations are video frames in a video).

Once trained, the encoder neural network can generate latent representations (and context latent representations) that can be used for any of a variety of purposes. For example, latent representations of audio data segments can be used to perform phoneme prediction, grapheme prediction, or speaker identity prediction. As another example, latent representations of the regions of an image can be used to perform object classification (i.e., to predict the type of an object depicted in the image), object detection, object segmentation, image colorization, or image super-resolution. As another example, latent representations of sentences in a portion of text can be used to perform sentiment prediction, e.g., to predict whether a product review has a "positive", "neutral", or "negative" sentiment. As another example, latent representations of observations of an environment can be processed by an action selection neural network to select actions to be performed by an agent interacting with the environment. As another example, latent representations of observations of an environment can be used to train an action selection neural network using imitation learning techniques, as will be described in more detail next with reference to FIG. 2-4.

Figure 2:
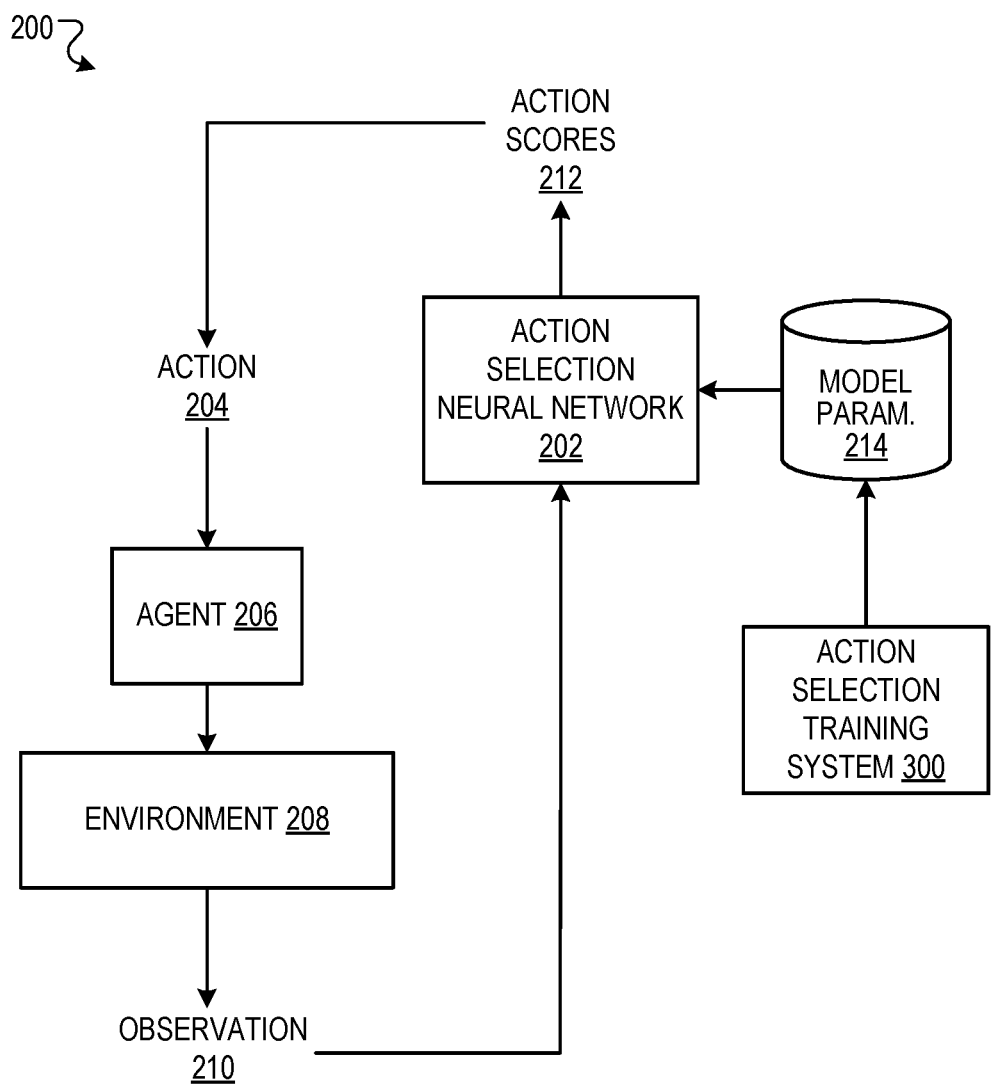
FIG. 2 illustrates an example data flow for using an action selection neural network to select actions to be performed by an agent interacting with an environment.

FIG. 2 illustrates an example data flow 200 for using an action selection neural network 202 to select actions 204 to be performed by an agent 206 interacting with an environment 208 at each of multiple time steps to accomplish a task. At each time step, the action selection network 202 processes an observation 210 characterizing the current state of the environment 208 in accordance with the current values of its model parameters 214 to generate action scores 212 that are used to select an action 204 to be performed by the agent 206 in response to the observation. At each time step, the state of the environment 208 at the time step (as characterized by the observation 210) depends on the state of the environment 208 at the previous time step and the action 204 performed by the agent 206 at the previous time step.

In some implementations, the environment is a real-world environment and the agent is a mechanical agent interacting with the real-world environment. For example, the agent may be a robot interacting with the environment, e.g., to locate an object of interest in the environment, to move an object of interest to a specified location in the environment, to physically manipulate an object of interest in the environment, or to navigate to a specified destination in the environment; or the agent may be an autonomous or semi-autonomous land, air, or sea vehicle navigating through the environment to a specified destination in the environment.

In these implementations, the observations may include, for example, one or more of images, object position data, and sensor data to capture observations as the agent interacts with the environment, for example sensor data from an image, distance, or position sensor or from an actuator.

For example in the case of a robot the observations may include data characterizing the current state of the robot, e.g., one or more of: joint position, joint velocity, joint force, torque or acceleration, for example gravity-compensated torque feedback, and global or relative pose of an item held by the robot.

In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations.

The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In the case of an electronic agent the observations may include data from one or more sensors monitoring part of a plant or service facility such as current, voltage, power, temperature and other sensors and/or electronic signals representing the functioning of electronic and/or mechanical items of equipment.

The actions may be control inputs to control a robot, e.g., torques for the joints of the robot or higher-level control commands, or the autonomous or semi-autonomous land or air or sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Actions may additionally or alternatively include electronic control data such as motor control data, or more generally data for controlling one or more electronic devices within the environment the control of which has an effect on the observed state of the environment. For example in the case of an autonomous or semi-autonomous land, air, or sea vehicle the actions may include actions to control navigation e.g. steering, and movement e.g., braking and/or acceleration of the vehicle.

In some implementations the environment is a simulated environment and the agent is implemented as one or more computers interacting with the simulated environment.

For example the simulated environment may be a simulation of a robot or vehicle and the action selection network may be trained on the simulation. For example, the simulated environment may be a motion simulation environment, e.g., a driving simulation or a flight simulation, and the agent may be a simulated vehicle navigating through the motion simulation. In these implementations, the actions may be control inputs to control the simulated user or simulated vehicle.

In another example, the simulated environment may be a video game and the agent may be a simulated user playing the video game.

In a further example the environment may be a protein folding environment such that each state is a respective state of a protein chain and the agent is a computer system for determining how to fold the protein chain. In this example, the actions are possible folding actions for folding the protein chain and the result to be achieved may include, e.g., folding the protein so that the protein is stable and so that it achieves a particular biological function. As another example, the agent may be a mechanical agent that performs or controls the protein folding actions selected by the system automatically without human interaction. The observations may include direct or indirect observations of a state of the protein and/or may be derived from simulation.

Generally in the case of a simulated environment the observations may include simulated versions of one or more of the previously described observations or types of observations and the actions may include simulated versions of one or more of the previously described actions or types of actions.

Training an agent in a simulated environment may enable the agent to learn from large amounts of simulated training data while avoiding risks associated with training the agent in a real world environment, e.g., damage to the agent due to performing poorly chosen actions. An agent trained in a simulated environment may thereafter be deployed in a real-world environment.

In some other applications the agent may control actions in a real-world environment including items of equipment, for example in a data center or grid mains power or water distribution system, or in a manufacturing plant or service facility. The observations may then relate to operation of the plant or facility. For example the observations may include observations of power or water usage by equipment, or observations of power generation or distribution control, or observations of usage of a resource or of waste production. The agent may control actions in the environment to increase efficiency, for example by reducing resource usage, and/or reduce the environmental impact of operations in the environment, for example by reducing waste. The actions may include actions controlling or imposing operating conditions on items of equipment of the plant/facility, and/or actions that result in changes to settings in the operation of the plant/facility e.g. to adjust or turn on/off components of the plant/facility.

Optionally, in any of the above implementations, the observation at any given time step may include data from a previous time step that may be beneficial in characterizing the environment, e.g., the action performed at the previous time step.

The action scores 212 generated by the action selection network 202 at each time step may include a respective numerical value for each action in a set of possible actions that can be performed by the agent at the time step. The action scores 212 can be used in any of a variety of ways to determine the action 204 to be performed by the agent 206 at a time step. For example, each action score 212 may represent a respective probability value for an action in the set of possible actions. The action 204 to be performed by the agent 206 at the time step can be determined by sampling an action in accordance with the probability values for the actions. As another example, the action with the highest action score 212 may selected as the action to be performed at the time step.

The action selection network 202 can be implemented with any appropriate neural network architecture that enables it to perform its described function. In one example, the action selection network 202 may include an input layer (which receives an observation), followed by one or more convolutional layers, one or more fully-connected layers, and an output layer (which outputs the action scores).

At each time step, the agent 206 receives a reward (represented as a numerical value) based on the current state of the environment 208, the action 204 performed by the agent 206 at the time step, and the subsequent state of the environment after the agent performs the action. To enable the action selection network 202 to select actions that cause the agent to accomplish a task, the training system 300 trains the action selection network 202 to select actions that maximize a cumulative measure of rewards received by the agent using reinforcement learning techniques. The cumulative measure of rewards received by the agent may be, e.g., a long-term time-discounted sum of rewards.

The training system 300 may determine the reward received by the agent for performing an action at a time step based (at least in part) on an "imitation score" for the subsequent observation that results from the agent performing the action. An imitation score for an observation characterizes the likelihood that the observation is from an expert trajectory, i.e., a sequence of expert observations characterizing respective states of the environment while an agent interacts with the environment by performing a sequence of expert actions that accomplish the task. Generally, each expert observation may be understood as characterizing a state of the environment that has been classified as being relevant to accomplishing the task, and expert trajectories provide "demonstrations" of how the task can be accomplished. The expert trajectories may be obtained, e.g., by enabling a person to control the agent (or another agent) by selecting actions to be performed by the agent to accomplish the task or by observing another agent that has already been trained on the task or is hard-coded to perform the task, and logging the resulting expert trajectories.

The training system 300 may generate the imitation score for an observation based on a latent representation of the observation, in particular, by processing the latent representation of the observation using a "discriminator" neural network. The discriminator neural network is trained to discriminate between latent representations of (i) agent observations (i.e., resulting from actions selected using the action selection network 202) and (ii) expert observations (i.e., resulting from expert actions), as will be described in more detail with reference to FIG. 4. In some implementations, the training system 300 generates the latent representation of an observation by processing the observation using an encoder neural network that is trained using the encoder network training system 100 described with reference to FIG. 1. In some implementations, the training system 300 generates the latent representation of an observation by processing the observation using the action selection network and identifying an intermediate output of the action selection network as the latent representation.

Training the action selection neural network to maximize the reward received by the agent (and, by extension, the imitation scores resulting from the actions performed by the agent) encourages the action selection network to select actions that imitate the expert demonstrations specified by the expert observations. Generating the imitation scores based on the latent representations of the observations results in the action selection network being trained to imitate the expert demonstrations in "latent space" (i.e., the space of possible latent representations) rather than in "observation space" (i.e., the space of possible observations). Latent representations of observations may be compact representations of high-level features of the environment that are relevant to performing the task, while the observations themselves may encode substantial amounts of noisy and superfluous information that is irrelevant to performing the task. Therefore, training the action selection network to imitate the expert demonstrations in latent space (i.e., rather than in observation space) may enable the action selection network to be trained more effectively.

Figure 3:
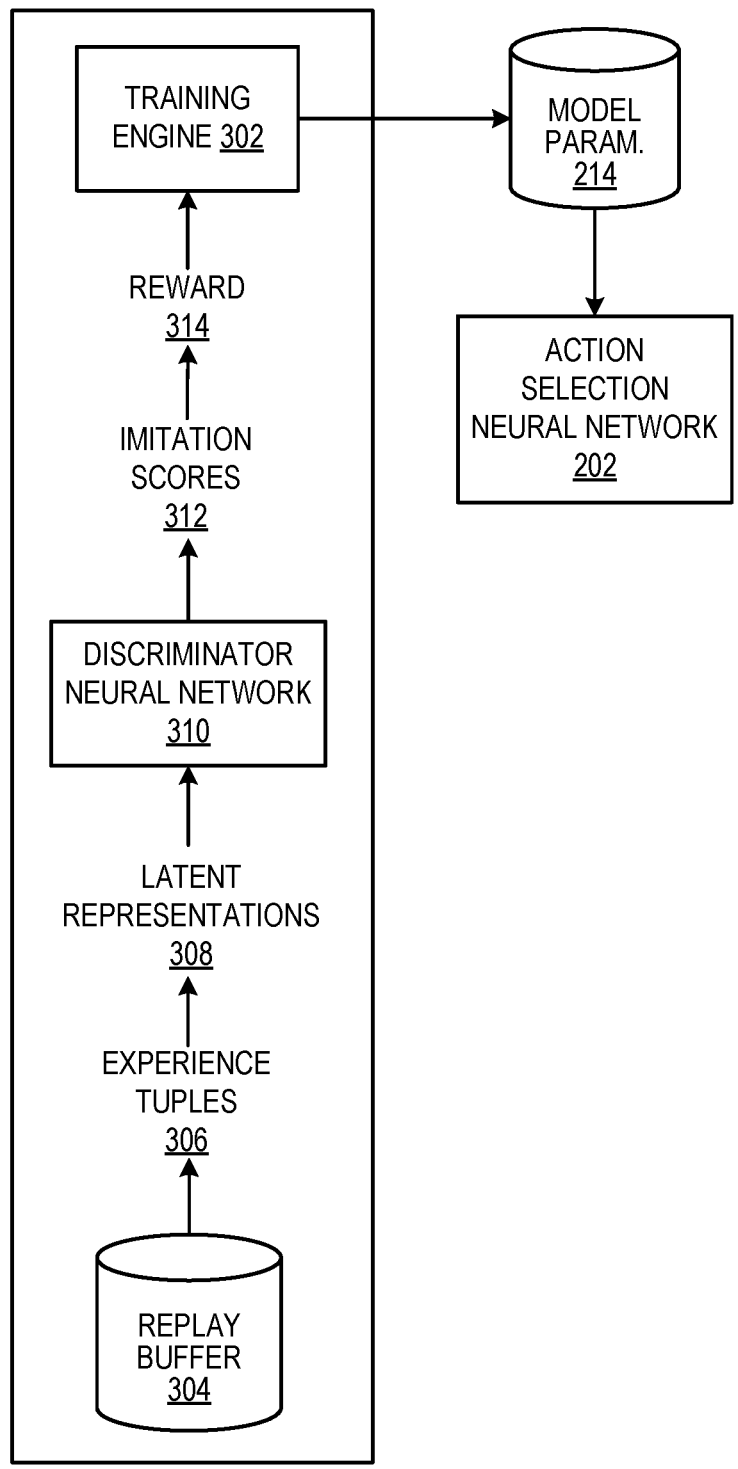
FIG. 3 shows an example action selection network training system.

FIG. 3 shows an example action selection network training system 300. The action selection network training system 300 is an example of a system implemented as computer programs on one or more computers in one or more locations in which the systems, components, and techniques described below are implemented.

The training system 300 is configured to train the action selection network 202 by using a training engine 302 to iteratively update the model parameters 214 of the action selection network 202 using reinforcement learning techniques. In particular, the training system 300 trains the action selection network 202 on "experience tuples" stored in a replay buffer 304 that characterize previous interactions of the agent with the environment. Each experience tuple may specify: (i) an observation characterizing the state of the environment at a time step, (ii) an action performed by the agent in response to the observation, (iii) a subsequent observation resulting from the agent performing the action, and (iv) a "task reward" that may indicate, e.g., whether the agent has accomplished the task, or the progress of the agent towards accomplishing a task. The task reward may be sparse (i.e., rarely non-zero), e.g., the agent may receive a non-zero task reward only at the time step that the task is accomplished. In some cases, the replay buffer 304 may store experience tuples characterizing interactions of multiple agents with respective environments, e.g., interactions of multiple agents with different instantiations of a simulated environment.

At each of multiple training iterations, the training system 300 selects a "batch" (set) of experience tuples 306 from the replay buffer 304, and generates a respective latent representation 308 of the subsequent observation specified by each experience tuple 306. Generally, the latent representation 308 of an observation is compact representation of the observation that may encode high-level features of the environment that are relevant to performing the task. A few examples of generating a latent representation of an observation are described next.

In one example, the training system 300 may generate the latent representation of an observation by processing the observation using an encoder neural network that is trained using the encoder network training system 100 described with reference to FIG. 1. In this example, the encoder neural network is trained to generate a latent representation for an observation in a sequence of observations such that the latent representation is predictive of the latent representations of subsequent observations in the sequence. In some cases, the encoder neural network may be pre-trained on the sequences of expert observations specified by the expert trajectories. Alternatively or in combination, the encoder neural network may be continuously trained based on sequences of observations specified by the experience tuples in the replay buffer 304 that characterize the interaction of the agent with the environment.

In another example, the training system 300 may generate the latent representation of an observation by processing the observation using the action selection network 202, and identifying the latent representation of the observation as an intermediate output of the action selection network. An intermediate output of a neural network refers to an output that is generated by a hidden layer of the neural network, i.e., a layer that follows the input layer but precedes the output layer of the neural network. In some cases, the term "action selection network" may be understood as encompassing multiple neural networks that are jointly trained using reinforcement learning techniques, e.g., a "critic" and an "actor" neural network. In this example, the actor (policy) network may process an observation to generate a set of action scores of possible actions, and the critic network (Q network or value network) may process an observation to generate a state-value (V value) or an action-value (Q value). A state-value may estimate the cumulative reward that will be received as a result of the environment being in the state characterized by the observation, and an action value may estimate the cumulative reward that will be received as a result of the performing an action when the environment is in the state characterized by the observation. In the case that the action selection network encompasses multiple jointly trained neural networks, the training system 300 may identify the latent representation of an observation as the intermediate output of any of these neural networks (e.g., as an intermediate output of an actor neural network or a critic neural network).

In another example, the training system 300 may generate the latent representation of an observation by processing the observation using a "random projection" neural network. A random projection neural network refers to a neural network that: (i) generates an output having a lower-dimensionality than its input, and (ii) has parameter values that are selected randomly rather than being trained. Latent representations generated using a random projection network may be less informative than latent representations generated using an encoder network or the action selection network. However the reduced dimensionality of latent representations generated by a random projection network (i.e., relative to the observations) may still provide benefits to the training of the action selection network.

The training system 300 processes each latent representation 308 using the discriminator neural network 310 to generate a corresponding imitation score 312 for the latent representation. The discriminator neural network 310 is trained to process a latent representation of an observation to generate an imitation score characterizing a likelihood that the observation is an expert observation. For example, the imitation score for an observation may be a probability value (i.e., a numerical value in the range [0,1]) indicating the probability that the observation is an expert observation. An example of a discriminator neural network training system for training the discriminator neural network 310 is described with reference to FIG. 4. The discriminator neural network can have any appropriate neural network architecture that enables it to perform its described function. In one example, the discriminator neural network may have a single neural network layer (e.g., a fully-connected layer) that projects an input latent representation onto an imitation score.

The training system 300 determines a respective reward 314 corresponding to each experience tuple 306 based on the imitation score 312 for the subsequent observation specified by the experience tuple 306. For example, for an experience tuple (s, α, $r_{task}$, s'), where s is the initial observation, α is the action performed in response to the observation s, $r_{task}$ is the task reward, and s' is the subsequent observation resulting from performing the action α, the training system 300 may determine the reward r corresponding to the experience tuple as:

$$r = \alpha \cdot D(s') + (1-\alpha) \cdot r_{task} \qquad (5)$$

where α is a scaling factor in the range [0,1], D(s') represents the imitation score for the subsequent observation, and $r_{task}$ represents the task reward. In some cases, the training system 300 can train the action selection network even when no task reward is available, e.g., as described with reference to equation (6).

The training engine 302 uses the training data provided by the experience tuples 306 and the rewards 314 to train the action selection network 202 using reinforcement learning techniques. Generally, the training engine 302 updates the current values of the model parameters 214 of the action selection network 202 to increase a cumulative measure of reward received by the agent by performing actions selected by the action selection network 202. The training engine 302 can use any appropriate reinforcement learning technique, e.g., on-policy or off-policy reinforcement learning techniques, e.g., Q-learning techniques, actor-critic techniques, or deep distributed deterministic policy gradients (D4PG) techniques.

In some cases, the training system 300 may also determine the reward 314 for an experience tuple using a "goal discriminator" neural network. The goal discriminator neural network is trained to process an observation to generate a "goal score" characterizing a likelihood that the observation is: (i) included in an expert trajectory, and (ii) within a threshold number of observations of the last observation of the expert trajectory. Goal scores generated by the goal discriminator network can be used as an alternative to or in combination with task rewards to determine the overall rewards corresponding to experience tuples. For example, the training system 300 may determine the reward r corresponding to an experience tuple (s, α, $r_{task}$, s') as:

$$r = \alpha \cdot D(s') + (1-\alpha) \cdot D_{goal}(s') \qquad (6)$$

where α is a scaling factor in the range [0,1], D(s') represents the imitation score for the subsequent observation s', and $D_{goal}(s')$ represents the goal score for the subsequent observation s'. In some cases, determining the rewards 314 using task rewards may bound the agent performance by the performance of the expert demonstrators, while determining the rewards 314 using goal scores can enable the agent to surpass the performance of the expert demonstrators, e.g., by accomplishing the task faster. Example techniques for training the goal discriminator neural network are described with reference to FIG. 4.

Optionally, the training system 300 may use the discriminator network to dynamically generate imitation scores for observations characterizing current states of the environment while the agent is interacting with the environment. If the imitation score for a current observation indicates that the observation has a sufficiently low likelihood of being an expert observation (e.g., the imitation score is below a predefined threshold value, e.g., 0.1, or any other appropriate value), the training system 300 may terminate the interaction of the agent with the environment. The training system 300 may "reset" the state of the environment, and the agent may thereafter resume interacting with the environment (i.e., to generate experience tuples that are stored in the replay buffer). In one example, the agent may be interacting with a simulated environment, and the training system 300 may reset the state of the environment by causing the state of the environment to revert to a default initial state. Terminating the interaction of the agent with the environment in this manner may prevent the agent from drifting too far from the expert trajectories, and therefore make the training more efficient (e.g., by reducing computational resource consumption). Moreover, when the action selection system is selecting actions to be performed in a real-world environment (e.g., by a physical robot, or to control a facility, e.g., the cooling systems in a data center), terminating the interaction of the agent with the environment in this manner may reduce the potential for damage to the agent and the environment.

Figure 4:
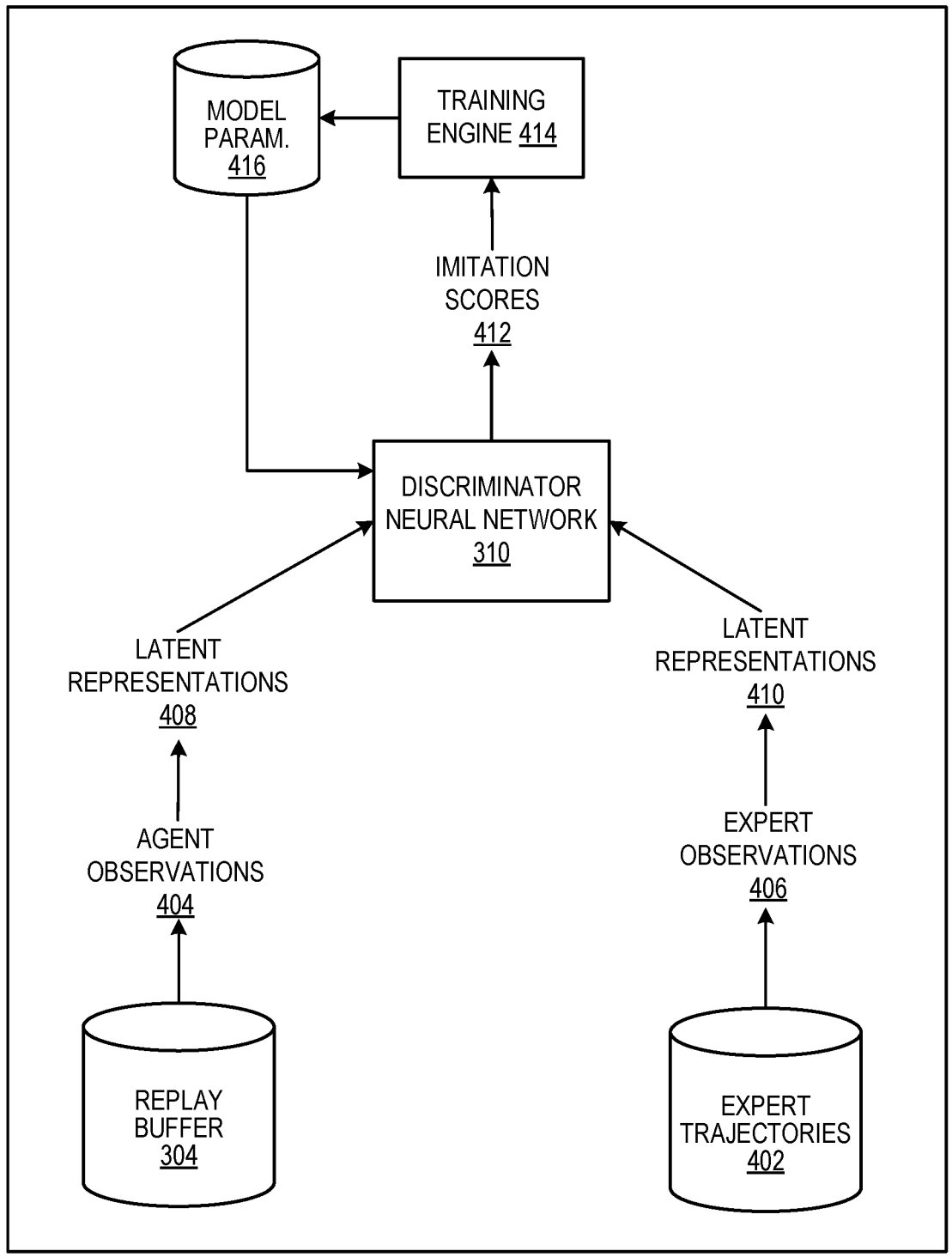
FIG. 4 shows an example discriminator network training system.

FIG. 4 shows an example discriminator network training system 400. The discriminator network training system 400 is an example of a system implemented as computer programs on one or more computers in one or more locations in which the systems, components, and techniques described below are implemented.

The discriminator network training system 400 is configured to train the discriminator neural network 310 to process an observation characterizing a state of the environment to generate an imitation score characterizing a likelihood that the observation is included in an expert trajectory 402. More specifically, the training system 400 trains the discriminator network 310 to generate imitation scores that discriminate between: (i) agent observations 404 from the replay buffer 304, and (ii) expert observations 406 from expert trajectories 402. The agent observations 404 from the replay buffer 304 characterize states of the environment while the agent performs actions selected using the action selection network. The expert observations 406 from the expert trajectories 402 characterize the state of the environment while an expert demonstrator performs expert actions to accomplish the task.

At each of multiple training iterations, the training system 400 selects a "batch" (set) of observations that includes agent observations 404 from the replay buffer and expert observations 406 from the expert trajectories 402. The training system 400 processes latent representations 408 of the agent observations 404 from the replay buffer and latent representations 410 of the expert observations 406 from the expert trajectories 402 using the discriminator network 310 to generate corresponding imitation scores 412. The training system 400 then uses a training engine 414 to determine gradients of an objective function dependent on the imitation scores 412, and uses the gradients to adjust the current values of the model parameters 416 of the discriminator network 310.

For each latent representation of an agent observation from the replay buffer 304, the objective function may measure a difference between: (i) the imitation score generated by the discriminator network for the latent representation, and (ii) a target imitation score (e.g., 0) indicating that the observation is from the replay buffer.

For each latent representation of an expert observation from an expert trajectory, the objective function may measure a difference between: (i) the imitation score generated by the discriminator network for the latent representation, and (ii) a target imitation score (e.g., 1) which indicates that the observation is from an expert trajectory.

During training of the discriminator neural network, the training system 400 may refrain from backpropagating gradients of the objective function used to train the discriminator neural network through, e.g., the encoder neural network and the action selection neural network.

Generally, the goal discriminator neural network (described with reference to FIG. 3) may be trained in an analogous manner to the discriminator neural network 310. More specifically, the training system 400 may train the goal discriminator neural network to generate imitation scores that discriminate between: (i) "goal" observations, and (ii) "non-goal" observations. Goal observations may be drawn from within a threshold number of observations of the last observation of an expert trajectory, e.g., from the last 1/M observations in an expert trajectory, where the value of M may be given by 3, 5, or any other appropriate value. Non-goal observations may be observations drawn from a portion of an expert trajectory that is not within the threshold number of observations of the last observation, or observations drawn from the replay buffer.

The discriminator neural network may be trained in parallel with the action selection neural network. That is, the discriminator neural network may be trained using observations resulting from actions selected in accordance with the latest values of the action selection network parameters, and the action selection network may be trained using imitation scores generated in accordance with the latest values of the discriminator network parameters. This "adversarial" training pits the discriminator network against the action selection network, and encourages the action selection network to continually learn to imitate the expert demonstrations more effectively.

Figure 5:
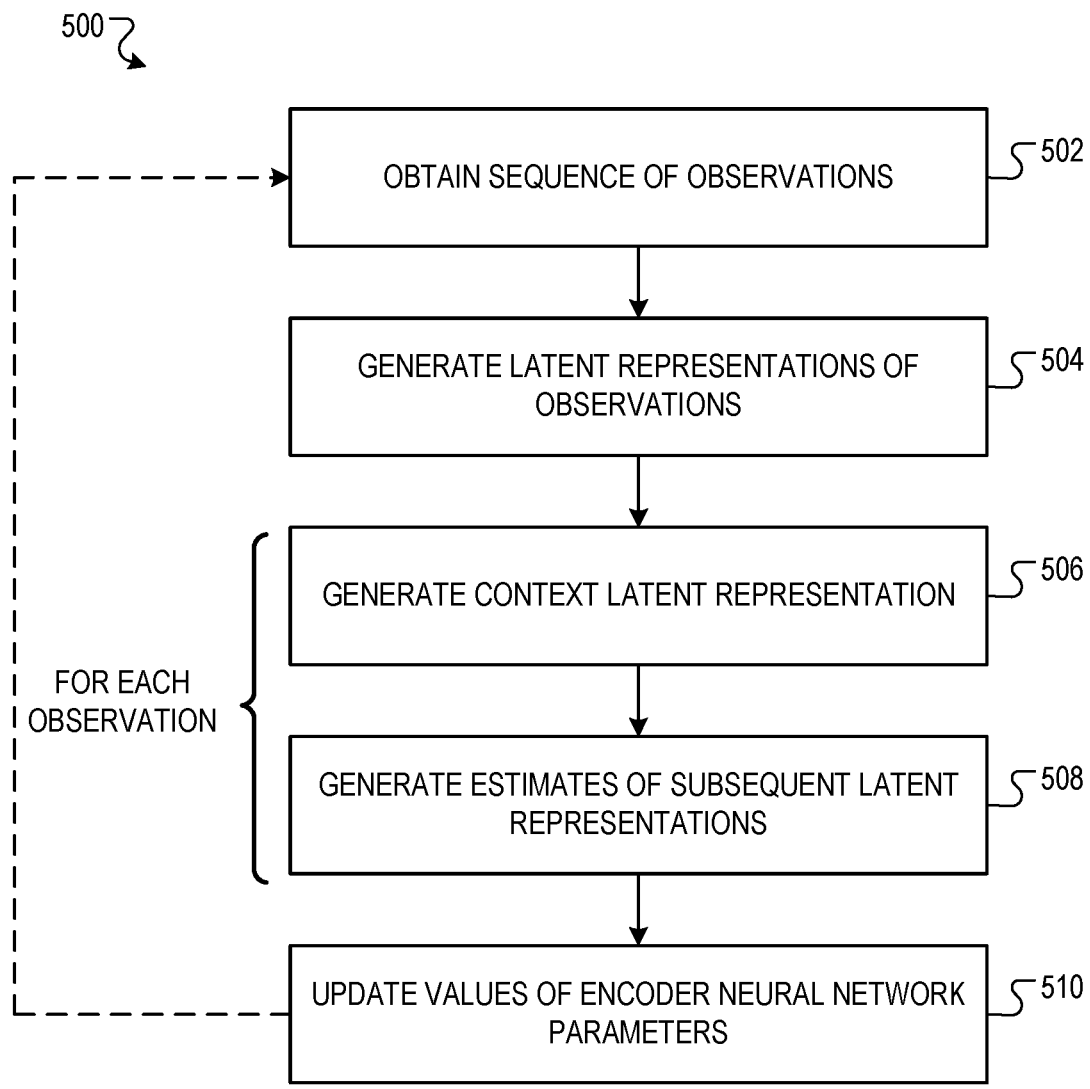
FIG. 5 is a flow diagram of an example process for training an encoder neural network.

FIG. 5 is a flow diagram of an example process 500 for training an encoder neural network. For convenience, the process 500 will be described as being performed by a system of one or more computers located in one or more locations. For example, an encoder network training system, e.g., the encoder network training system 100 of FIG. 1, appropriately programmed in accordance with this specification, can perform the process 500.

The system obtains a sequence of observations (502). The sequence of observations may include a sequence of segments of an audio waveform, a sequence of regions of an image or a sequence of images, or a sequence of sentences in a natural language.

The system processes each observation in the sequence of observations using an encoder neural network to generate a corresponding latent representation of the observation (504). The encoder neural network may include one or more convolutional neural network layers, and the latent representation of an observation may be a compressed representation of the observation.

For each of one or more observations in the sequence, the system generates a context latent representation of the observation (506) and uses the context latent representation to generate estimates of the latent representations of one or more subsequent observations (508). The system may generate the context latent representation of an observation from the latent representation of the observation and the latent representations of one or more preceding observations. The context latent representation of an observation may jointly summarize the latent representation of the observation and the latent representations of the one or more preceding observations. To generate the context latent representation of an observation, the system may process the latent representation of the observation and the latent representations of one or more preceding observations using a context neural network. The context neural network may be a recurrent neural network. To generate an estimate of the latent representation of a subsequent observation from the context latent representation of an observation, the system may identify a prediction parameter matrix based on a number of observations separating the observation and the subsequent observation. The system may then determine the estimate of the latent representation of the subsequent observation as a product between the context latent representation and the prediction parameter matrix.

The system determines a gradient of a loss (objective) function with respect to the current values of the encoder network parameters, and updates the current values of the encoder network parameters using the gradient (510). For each of one or more observations, the loss function characterizes the accuracy of the estimates of the latent representations of the subsequent observations that are generated using the context latent representation of the observation. In some implementations, the loss function may be a noise contrastive estimation (NCE) loss function, e.g., as described with reference to equations (2)-(4).

After updating the current values of the encoder network parameters, the system may return to step 502 and continue training the encoder network by iteratively adjusting the values of its model parameters. After the encoder neural network is trained, it can be used for any of a variety of purposes, e.g., the encoder neural network can be used by a reinforcement learning system to generate latent representations of observations of an environment that are used to select actions to be performed by an agent.

Figure 6:
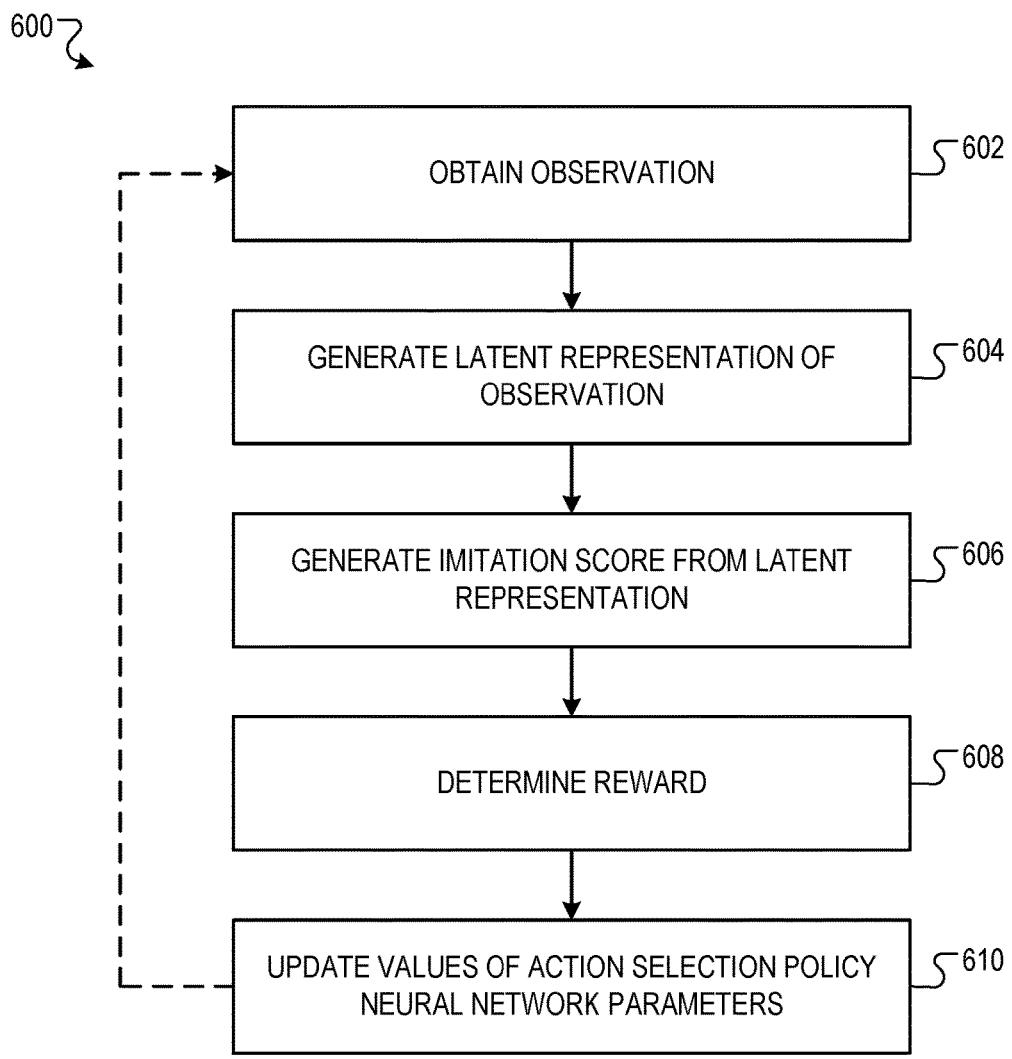
FIG. 6 is a flow diagram of an example process for training an action selection neural network.

FIG. 6 is a flow diagram of an example process 600 for training an action selection neural network. For convenience, the process 600 will be described as being performed by a system of one or more computers located in one or more locations. For example, an action selection network training system, e.g., the action selection network training system 300 of FIG. 3, appropriately programmed in accordance with this specification, can perform the process 600.

The system obtains an observation characterizing a state of the environment subsequent to the agent performing a selected action (602). The system may obtain the observation, e.g., by sampling an observation from a replay buffer.

The system generates a latent representation of the observation (604). In some implementations, the system generates the latent representation of the observation by processing the observation using encoder neural network. The encoder neural network may be trained to process an observation in a sequence of observations to generate a latent representation of the observation that is predictive of latent representations generated by the encoder neural network of one or more subsequent observations in the sequence. In some implementations, the system identifies the latent representation of the observation as an intermediate output generated by an action selection network by processing the observation.

The system processes the latent representation of the observation using a discriminator neural network to generate an imitation score that characterizes a likelihood that the observation is included in an expert trajectory (606). An expert trajectory is a sequence of observations characterizing respective states of the environment while an agent interacts with the environment by performing a sequence of actions that accomplish a task.

The system determines a reward from the imitation score (608). For example, the system may determine the reward as a weighted linear combination of a task reward (i.e., that characterizes a progress of the agent towards accomplishing the task) and the imitation score.

The system updates the current values of the action selection network parameters based on the reward using a reinforcement learning training technique (610).

After updating the current values of the action selection network parameters, the system may return to step 602 and continue iteratively training the action selection network.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for training an action selection policy neural network, wherein the action selection policy neural network has a plurality of action selection policy neural network parameters, wherein the action selection policy neural network is configured to process an observation characterizing a state of an environment in accordance with values of the action selection policy neural network parameters to generate an action selection policy output, wherein the action selection policy output is used to select an action to be performed by an agent interacting with an environment, the method comprising:
   obtaining an observation characterizing a state of the environment subsequent to the agent performing a selected action;
   generating a latent representation of the observation, comprising:
      (i) processing the observation using an encoder neural network to generate the latent representation of the observation, wherein the encoder neural network has been trained to process a given observation to generate a latent representation of the given observation that is predictive of latent representations generated by the encoder neural network of one or more other observations that are after the given observation in a sequence of observations; or
      (ii) processing the observation using the action selection policy neural network to generate the latent representation of the observation as an intermediate output of the action selection policy neural network;
   processing the latent representation of the observation using a discriminator neural network to generate an imitation score,
      wherein the imitation score characterizes a likelihood that the observation is included in an expert trajectory,
      wherein an expert trajectory is a sequence of observations characterizing respective states of the environment while a given agent interacts with the environment by performing a sequence of actions that accomplish a particular task;
   determining a reward from the imitation score; and
   adjusting the current values of the action selection policy neural network parameters based on the reward using a reinforcement learning training technique.

2. The method of claim 1, further comprising:
   obtaining a task reward characterizing a progress of the agent towards accomplishing the particular task; and
   determining the reward from the task reward in addition to the imitation score.

3. The method of claim 2, wherein determining the reward from the task reward in addition to the imitation score comprises:
   determining the reward as a weighted linear combination of the task reward and the imitation score.

4. The method of claim 1, further comprising:
   obtaining an expert observation from an expert trajectory in a set of multiple expert trajectories;
   processing the expert observation using the encoder neural network to generate a latent representation of the expert observation;
   processing the latent representation of the expert observation using the discriminator neural network to generate a given imitation score;
   determining a loss based on a difference between the given imitation score and a target imitation score which indicates that the expert observation is from an expert trajectory; and
   adjusting current values of discriminator neural network parameters based on the loss.

5. The method of claim 1, further comprising:
   determining a loss based on a difference between the imitation score and a target imitation score which indicates that the observation is not from an expert trajectory; and
   adjusting current values of discriminator neural network parameters based on the loss.

6. The method of claim 1, wherein the observation comprises an image.

7. The method of claim 1, wherein the encoder neural network is trained on training data comprising a plurality of expert trajectories.

8. The method of claim 1, further comprising:
   processing the latent representation of the observation using a second discriminator neural network to generate a second imitation score,
      wherein the second imitation score characterizes a likelihood that the observation is: (i) included in an expert trajectory, and (ii) within a threshold number of observations of a last observation of the expert trajectory; and
   determining the reward from the second imitation score in addition to the imitation score.

9. The method of claim 8, further comprising:
   obtaining an expert observation from an expert trajectory, wherein the expert observation is within the threshold number of observations of the last observation of the expert trajectory;
   processing the expert observation using the encoder neural network to generate a latent representation of the expert observation;
   processing the latent representation of the expert observation using the second discriminator neural network to generate a given second imitation score;
   determining a loss based on a difference between the given second imitation score and a target imitation score which indicates that the expert observation is from an expert trajectory and is within the threshold number of observations of the last observation in the expert trajectory; and
   adjusting current values of second discriminator neural network parameters based on the loss.

10. The method of claim 8, further comprising:
processing the latent representation of the observation using the second discriminator neural network to generate a particular second imitation score;
determining a loss based on a difference between the particular second imitation score and a target imitation score which indicates that the observation is not from within the threshold number of observations of the last observation in an expert trajectory; and
adjusting current values of second discriminator neural network parameters based on the loss.

11. The method of claim 1, wherein the discriminator neural network has a single neural network layer.

12. The method of claim 1, wherein obtaining an observation characterizing a state of the environment subsequent to the agent performing a selected action comprises:
sampling the observation from a replay buffer.

13. The method of claim 1, wherein the reinforcement learning training technique is a deep deterministic policy gradient training technique.

14. The method of claim 1, wherein the action selection policy neural network comprises a Q network and a policy network.

15. A system comprising:
one or more computers; and
one or more storage devices communicatively coupled to the one or more computers, wherein the one or more storage devices store instructions that, when executed by the one or more computers, cause the one or more computers to perform operations for training an action selection policy neural network, wherein the action selection policy neural network has a plurality of action selection policy neural network parameters, wherein the action selection policy neural network is configured to process an observation characterizing a state of an environment in accordance with values of the action selection policy neural network parameters to generate an action selection policy output, wherein the action selection policy output is used to select an action to be performed by an agent interacting with an environment, the operations comprising:
obtaining an observation characterizing a state of the environment subsequent to the agent performing a selected action;
generating a latent representation of the observation, comprising:
(i) processing the observation using an encoder neural network to generate the latent representation of the observation, wherein the encoder neural network has been trained to process a given observation to generate a latent representation of the given observation that is predictive of latent representations generated by the encoder neural network of one or more other observations that are after the given observation in a sequence of observations; or
(ii) processing the observation using the action selection policy neural network to generate the latent representation of the observation as an intermediate output of the action selection policy neural network;
processing the latent representation of the observation using a discriminator neural network to generate an imitation score,
wherein the imitation score characterizes a likelihood that the observation is included in an expert trajectory,
wherein an expert trajectory is a sequence of observations characterizing respective states of the environment while a given agent interacts with the environment by performing a sequence of actions that accomplish a particular task;
determining a reward from the imitation score;
adjusting the current values of the action selection policy neural network parameters based on the reward using a reinforcement learning training technique.

16. The system of claim 15, wherein the operations further comprise:
obtaining a task reward characterizing a progress of the agent towards accomplishing the particular task; and
determining the reward from the task reward in addition to the imitation score.

17. The system of claim 16, wherein determining the reward from the task reward in addition to the imitation score comprises:
determining the reward as a weighted linear combination of the task reward and the imitation score.

18. One or more non-transitory computer storage media storing instructions that when executed by one or more computers cause the one or more computers to perform operations for training an action selection policy neural network, wherein the action selection policy neural network has a plurality of action selection policy neural network parameters, wherein the action selection policy neural network is configured to process an observation characterizing a state of an environment in accordance with values of the action selection policy neural network parameters to generate an action selection policy output, wherein the action selection policy output is used to select an action to be performed by an agent interacting with an environment, the operations comprising:
obtaining an observation characterizing a state of the environment subsequent to the agent performing a selected action;
generating a latent representation of the observation, comprising:
(i) processing the observation using an encoder neural network to generate the latent representation of the observation, wherein the encoder neural network has been trained to process a given observation to generate a latent representation of the given observation that is predictive of latent representations generated by the encoder neural network of one or more other observations that are after the given observation in a sequence of observations; or
(ii) processing the observation using the action selection policy neural network to generate the latent representation of the observation as an intermediate output of the action selection policy neural network;
processing the latent representation of the observation using a discriminator neural network to generate an imitation score,
wherein the imitation score characterizes a likelihood that the observation is included in an expert trajectory,
wherein an expert trajectory is a sequence of observations characterizing respective states of the environment while a given agent interacts with the environment by performing a sequence of actions that accomplish a particular task;
determining a reward from the imitation score;
adjusting the current values of the action selection policy neural network parameters based on the reward using a reinforcement learning training technique.

19. The non-transitory computer storage media of claim 18, wherein the operations further comprise:

obtaining a task reward characterizing a progress of the agent towards accomplishing the particular task; and determining the reward from the task reward in addition to the imitation score.

20. The non-transitory computer storage media of claim 19, wherein determining the reward from the task reward in addition to the imitation score comprises:

determining the reward as a weighted linear combination of the task reward and the imitation score.

\* \* \* \* \*